Figure 1:
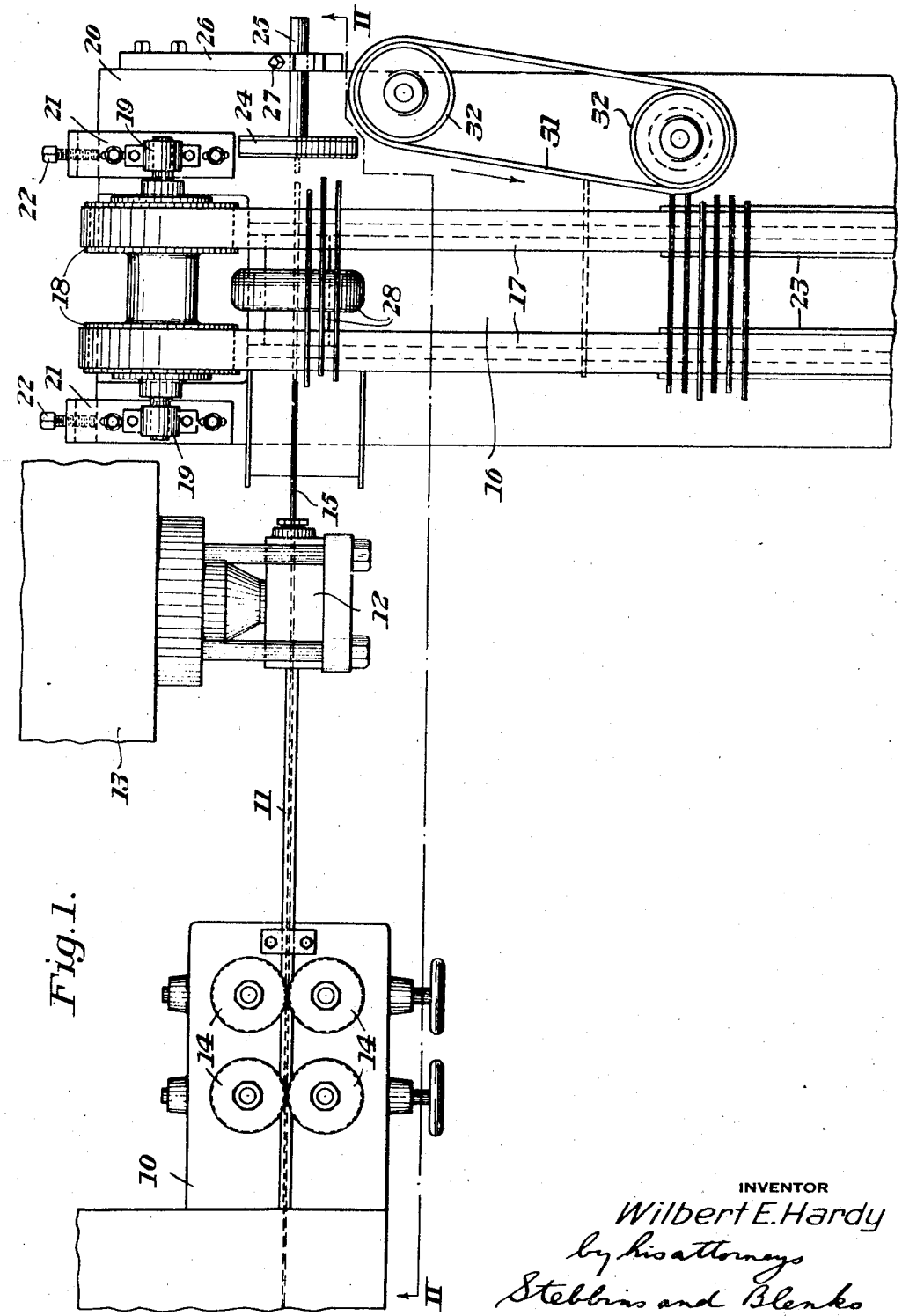

March 4, 1947. W. E. HARDY 2,416,690
APPARATUS FOR HANDLING WELDING RODS OR THE LIKE
Filed March 9, 1943 2 Sheets-Sheet 1

INVENTOR
Wilbert E. Hardy
by his attorneys
Stebbins and Blenko

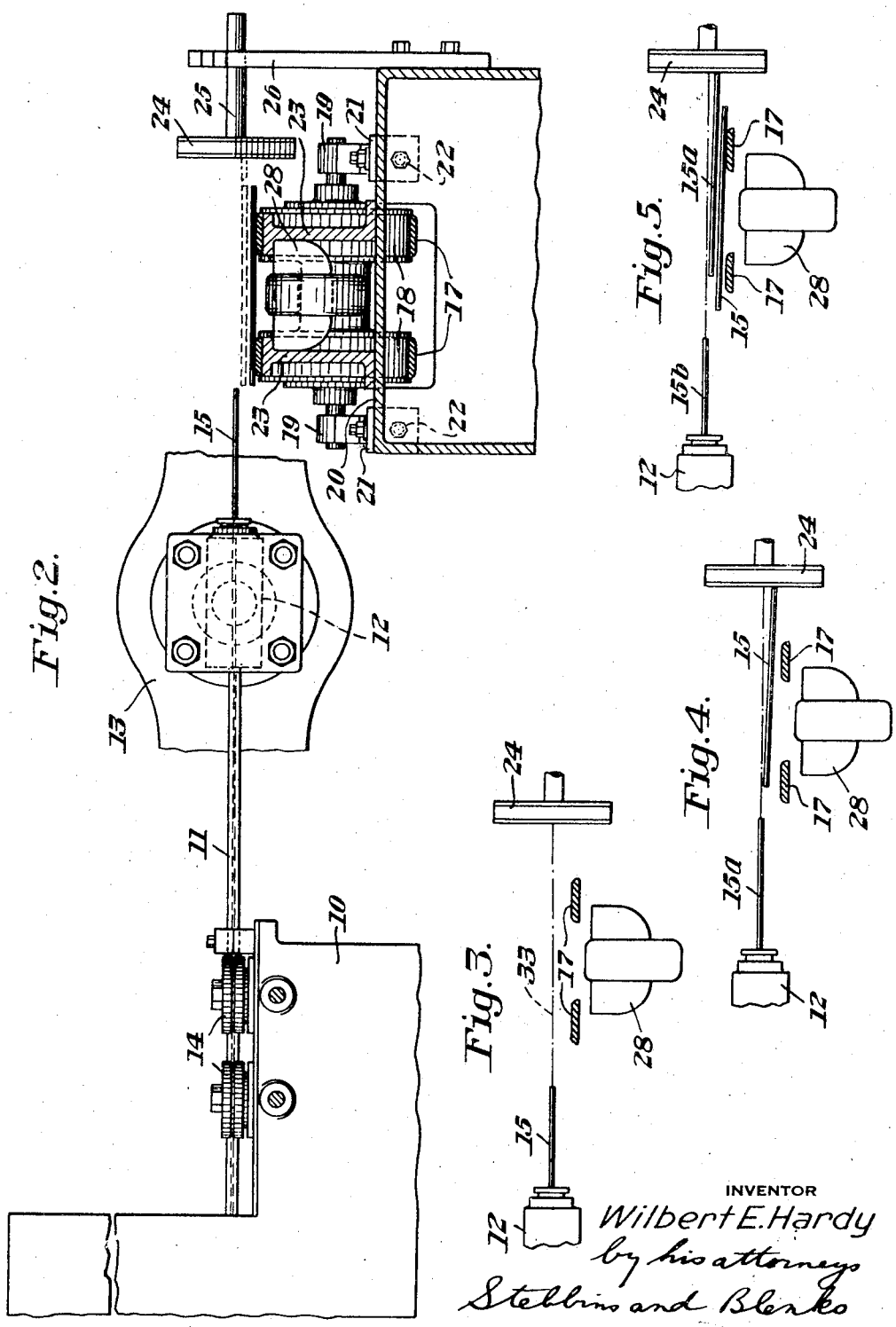

Patented Mar. 4, 1947

2,416,690

UNITED STATES PATENT OFFICE 2,416,690

APPARATUS FOR HANDLING WELDING RODS OR THE LIKE

Wilbert E. Hardy, McKees Rocks, Pa., assignor to The McKay Company, Pittsburgh, Pa., a corporation of Pennsylvania Application March 9, 1943, Serial No. 478,566

4 Claims. (Cl. 198—20)

This invention relates to the handling of rods of magnetic metal, and particularly, to apparatus for handling coated steel welding rods as discharged from an extruding die in rapid succession and in free flight.

Coated welding rods are now manufactured by various methods. One of these involves passing the rods longitudinally through the die of an extruding press effective to form a continuous coating of uniform thickness from end to end of the rod. According to this process, the rods are fed to the die in close order and in rapid succession by a feeder of known construction having a magazine in which rods delivered to a hopper are formed into a vertical bank for successive delivery to the die. After application of the coating, it is desired to brush the coating from one end of the rod to provide a conducting grip for the welding tongs, and also to pass the rods through a drying oven to harden the coating thereon.

Considerable difficulty has been experienced heretofore in positioning the coated rods on a conveyor, upon their emergence from the extruding die, for movement past the brushes and into the drying oven. Various expedients have been resorted to but none has proved satisfactory so far as I am aware and the disposition of the coated rods on a conveyor has remained the bottleneck restricting the rate of production.

I have invented a novel apparatus for disposing coated welding rods in orderly succession and in spaced apart relation on a delivery conveyor as they are discharged at high speed and in free flight, from the extruding die. In a preferred embodiment of the invention, I provide a target in the path of the rods as they are discharged from the die, which serves mechanically to arrest the rods and cause them to rebound slightly. I also provide a magnet adjacent the surface of the conveyor effective to draw the rods bodily downward and forward onto the conveyor as they move toward the target and rebound therefrom, and also to hold the rods in proper position on the conveyor and prevent them from bouncing around thereon and interfering with each other.

Further details, novel features and advantages of the invention will become apparent from the following complete description and explanation which refer to the accompanying drawings illustrating a preferred embodiment of the apparatus of my invention. In the drawings, Figure 1 is a partial plan view showing the rod feeder, the extruding die, the target and the carry-away or delivery conveyor;

Figure 2 is a view partly in elevation and partly in section along the plane of line II—II of Figure 1; and Figures 3 through 5 are diagrams illustrating the several steps in the delivery of a rod from the extruding die onto the conveyor.

Referring now in detail to the drawings and, for the present, to Figures 1 and 2 particularly, a rod-feeding mechanism 10 of known construction is adapted to deliver welding rods longitudinally and in close order through a tube 11 to a die 12 forming part of an extruding press indicated generally at 13. The mechanism 10 and press 13 are of known construction and no detailed description thereof is necessary but it is sufficient to state that the mechanism 10 by driven pinch rolls 14, frictionally forces rods through the tube 11 and the die 12 successively at high speed. In the die 11, the coating composition which is maintained under heavy pressure in the cylinder of the press 13 flows around the rods and forms a continuous coating of uniform thickness thereon from end to end. The coated rods are discharged from the die 12 under the combined effect of the thrust on the following rods exerted by the rolls 14 and the pressure applied to the coating material to cause it to flow around the rods and adhere thereto.

By the aid of the apparatus described so far, it is possible to deliver coated rods in close order and in rapid succession from the die 12. One of the rods emerging from the die is indicated at 15.

In order to remove the rods discharged from the extruding die 12 and deliver them past the brushes for removing the coating from one end and into the drying oven, I provide a conveyor 16 comprising a pair of belts 17 traveling about spaced pulleys 18 journaled in bearings 19 mounted on a suitable base or frame 20. The pair of pulleys 18 shown in the drawings are the idlers, the pulleys at the other end of the conveyor being driven at a suitable speed by any convenient driving means. The conveyor 16 thus provides a support moving continuously below the path of the rods as discharged from the die 12 and generally at right angles thereto. The bearings 19 for the idler pulleys 17 are mounted on slides 21 operated by screws 22 to facilitate belt tightening. Between the idler and driven pulleys, the upper runs of the belt 17 travel over guide rails 23 secured to the base or frame 20.

A target 24 in the form of a metal disc having its surface appropriately hardened is mounted in the path of the rods discharged from the extruding die and on the opposite side of the conveyor therefrom. The target is provided with a post 25 adjustably secured to a bracket 26 by a set screw 27. As will be apparent from the successive positions of a welding rod illustrated in the dotted lines in Figures 1 and 2, the rods discharged from the die pass over the conveyor in free flight, subject to the downward and forward attraction of the magnet next to be described, strike the target 24 and rebound slightly before coming to rest on the traveling belts of the conveyor 16.

In order to cause the rods to settle quickly onto the conveyor belts and to prevent them from bouncing around thereon, I provide a magnet 28 which may conveniently be an electro-magnet of U-shape, having an exciting coil thereon connected to a suitable source of magnetizing current. A magnetic field is thus maintained adjacent the upper runs of the conveyor belt 17 in the neighborhood of the path of travel of the coated rods as discharged from the die. This magnetic field has a two-fold effect. In the first place, it accelerates the rods downwardly toward the conveyor belts at a rate greater than the acceleration of gravity, thus insuring that each rod shall be removed from the path of the next oncoming rod prior to the arrival of the latter, thus avoiding interference and piling up of the rods. In the second place, the magnetic field serves to retain the rods on the conveyor belts, as long as the rods are within range of the field. This prevents the rods from bouncing around after first engaging the belts.

By virtue of the construction and arrangement described, the coated rods discharged from the die 12 are laid on the belts 17 in orderly fashion, parallel to each other and suitably spaced apart. All the rods do not rebound precisely the same amount from the target 24. For this reason, I provide rod-alining belts 31 trained around vertical pulleys 32, one of which is driven. The pulleys 32 are disposed so that the run of the belt 31 nearer the conveyor 16 provides an inclined surface effective progressively to bring the ends of successive rods on the conveyor 16 into alinement. A similar belt 31 and pulleys 32 are disposed on the opposite side of the conveyor 16 to bring the other ends of the rods into alinement.

Figures 3 through 5 show the several stages in the travel of a rod from the time of its discharge from the die 12, until it comes to rest upon the belts 17, as nearly as may be determined by eye. Figure 3 shows a rod 15 being discharged from the die 12 along the axis 33 of the latter. As soon as the rod leaves the die 12 the magnetic field produced by the electro-magnet 28 tends to pull the rod downwardly somewhat from its normal path, while it is still in free flight toward the target 24.

Figure 4 shows approximately the position in which the rod 15 reaches the target 24. On striking the target, the rod rebounds slightly but is still subject to the attraction of the magnetic field which is maintained continuously. By the time the rod 15 strikes the target 24, furthermore, the succeeding rod 15a is well on its way out of the die 12.

Figure 5 shows the last stage in the travel of the rod 15. As there illustrated, the rod is strongly attracted onto the conveyor belts 17 as it rebounds from the target 24, and is held securely in frictional contact with the belt surfaces so long as it is within the field. By the time the rod 15 has been caused to settle onto the belts 17, the succeeding rod 15a is about to strike the target, being approximately in the same position as rod 15 in Figure 4. At this instant, the third succeeding rod 15b is well on its way out of the die 12.

It will be apparent from the foregoing explanation and particularly from Figures 3 through 5, that the rods discharged by the die 12 traverse three distinct stages, viz., 1, fire; 2, strike (the arrest); and 3, the rebound and final settling down on the conveyor belts. It will be understood that this mode of operation contributes to the deposit of the rods on the conveyor belts in an orderly manner without confusion or interference. The continued travel of the belts of the conveyor 16 causes the rods settling thereon to lie in spaced apart relation and, since each rod goes through the same path as all the others, successive rods are laid on the conveyor belts in substantial parallelism and substantially at right angles to the path of the conveyor belts. The rods are made identical within very close tolerances so that the rate of descent thereof onto the conveyor belts, while in free flight, as well as the extent of the rebound from the target, is substantially identical for all rods.

The apparatus of my invention has important advantages over any expedient heretofore proposed for depositing coated rods emerging from an extruding die, onto a carry-away conveyor. In the first place, by my invention, I am able to handle rods at a speed much higher than has been possible heretofore, and yet position the rods successively on the conveyor belts in such an orderly fashion that little or no misalinement or disarrangement occurs. The magnetic field, being constantly maintained, exerts a strong force on each rod tending to get it out of the way of succeeding rods, both before and after striking the target. It is this characteristic that makes it possible for my invention to handle rods at high speeds such as those mentioned, without permitting the rods to pile up or deposit in a state of disorder. After the rods have been laid on the conveyor, they are carried away in continuous succession, past the brushes for removing the coating from one end of the rods and then to the conveyor for carrying the rods through the drying oven.

While I have illustrated and described but a preferred embodiment and practice of my invention, it will be recognized that changes in the exact arrangement and procedure disclosed may be made without departing from the spirit of the invention or the scope of the appended claims.

I claim:

1. Apparatus for handling magnetic rods discharged longitudinally in free flight and in rapid succession from a feeding mechanism, comprising a conveyor below the discharge path of said rods moving generally normal to said path, a target adjacent said conveyor adapted to arrest said rods in flight, and a magnet below said conveyor serving to attract said rods onto the conveyor on rebounding from said target.

2. Apparatus for handling magnetic rods discharged longitudinally in free flight and in rapid succession from a feeding mechanism, comprising a support moving below the path of said rods and generally transversely thereof, means for arresting said rods, and magnetic means urging them onto said support on rebounding from said arresting means.

3. Apparatus for handling magnetic rods discharged longitudinally in free flight and in rapid succession from a feeding mechanism, comprising a support moving below the path of said rods and generally transversely thereof, a target for arresting said rods, and a magnet below said support effective to urge the rods toward the support as they rebound from the target.

4. Apparatus for handling magnetic rods comprising means for successively discharging rods longitudinally along a predetermined path, a conveyor below said path moving transversely thereof, a target on the far side of the conveyor adapted to be struck by the rods, and a magnet adjacent said path effective to attract the rods onto said conveyor as they rebound from said target.

WILBERT E. HARDY.

REFERENCES CITED

The following references are of record in the file of this patent:

UNITED STATES PATENTS

| Number | Name | Date |
| --- | --- | --- |
| 2,320,797 | Robinson | June 1, 1943 |
| 2,274,677 | Eberhart | Mar. 3, 1942 |
| 1,103,358 | Hess | July 14, 1914 |
| 1,371,825 | Uhlig | Mar. 15, 1921 |
| 1,777,139 | Fitzgerald | Sept. 30, 1930 |

FOREIGN PATENTS

| Number | Country | Date |
| --- | --- | --- |
| 759,948 | French | Dec. 6, 1933 |